RADIO DETECTION AND RANGING SYSTEMS
Filed Dec. 30, 1947 9 Sheets-Sheet 1
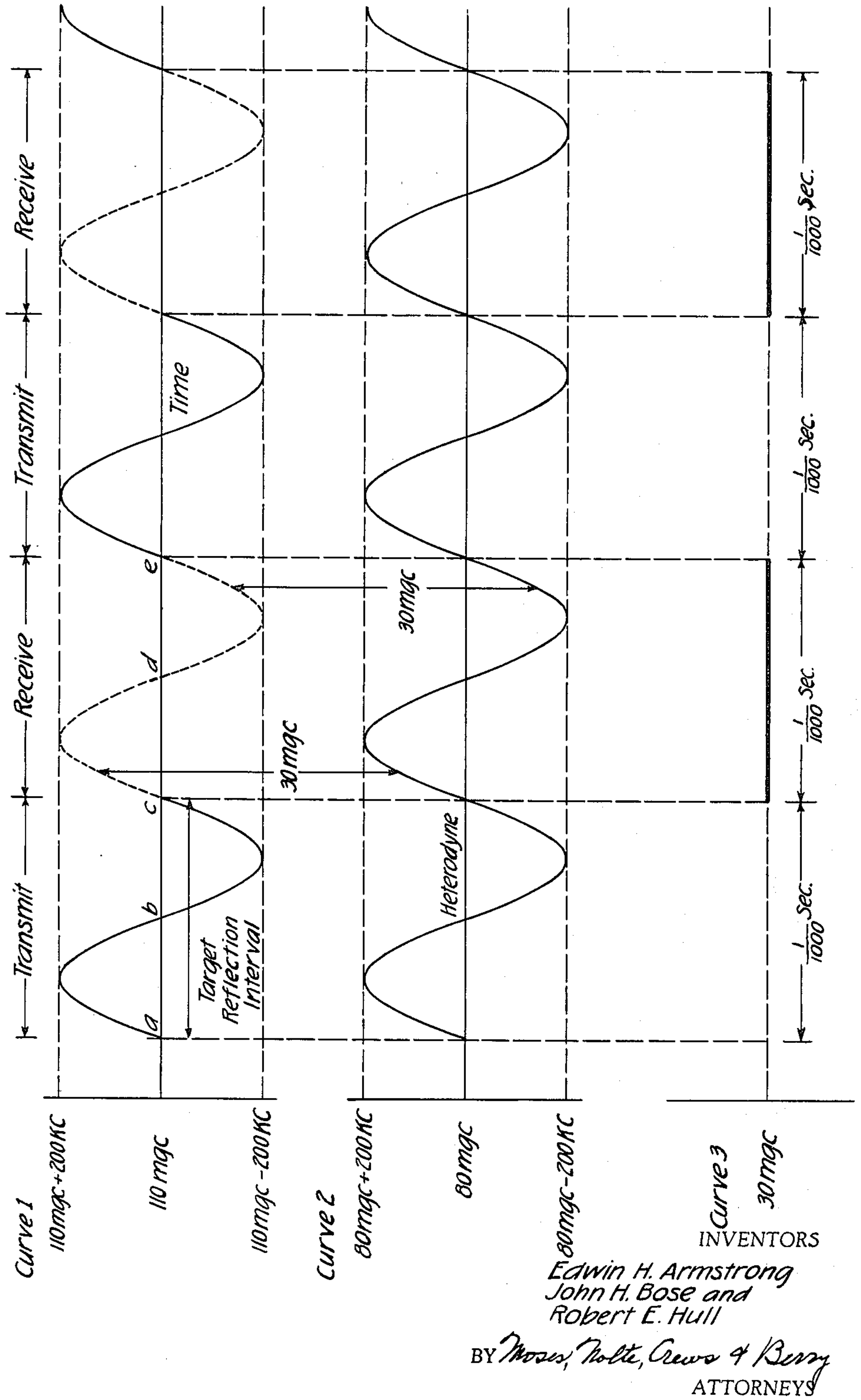
Fig. I.
INVENTORS
Edwin H. Armstrong
John H. Bose and
Robert E. Hull
BY Moses, Nolte, Crews & Berry
ATTORNEYS RADIO DETECTION AND RANGING SYSTEMS
Filed Dec. 30, 1947 9 Sheets-Sheet 2
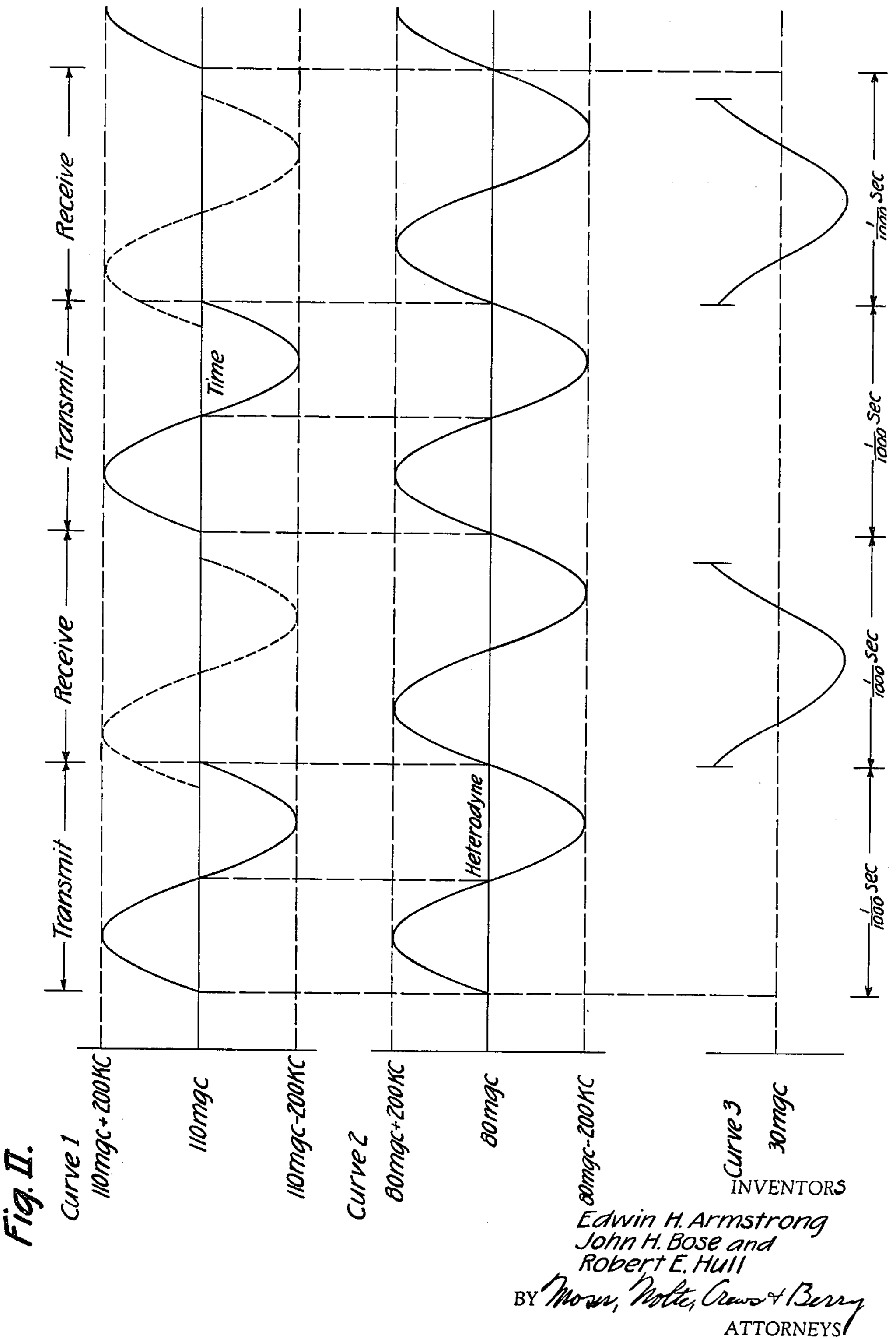
Fig. II.
INVENTORS
Edwin H. Armstrong
John H. Bose and
Robert E. Hull
BY Moses, Nolte, Crews & Berry
ATTORNEYS

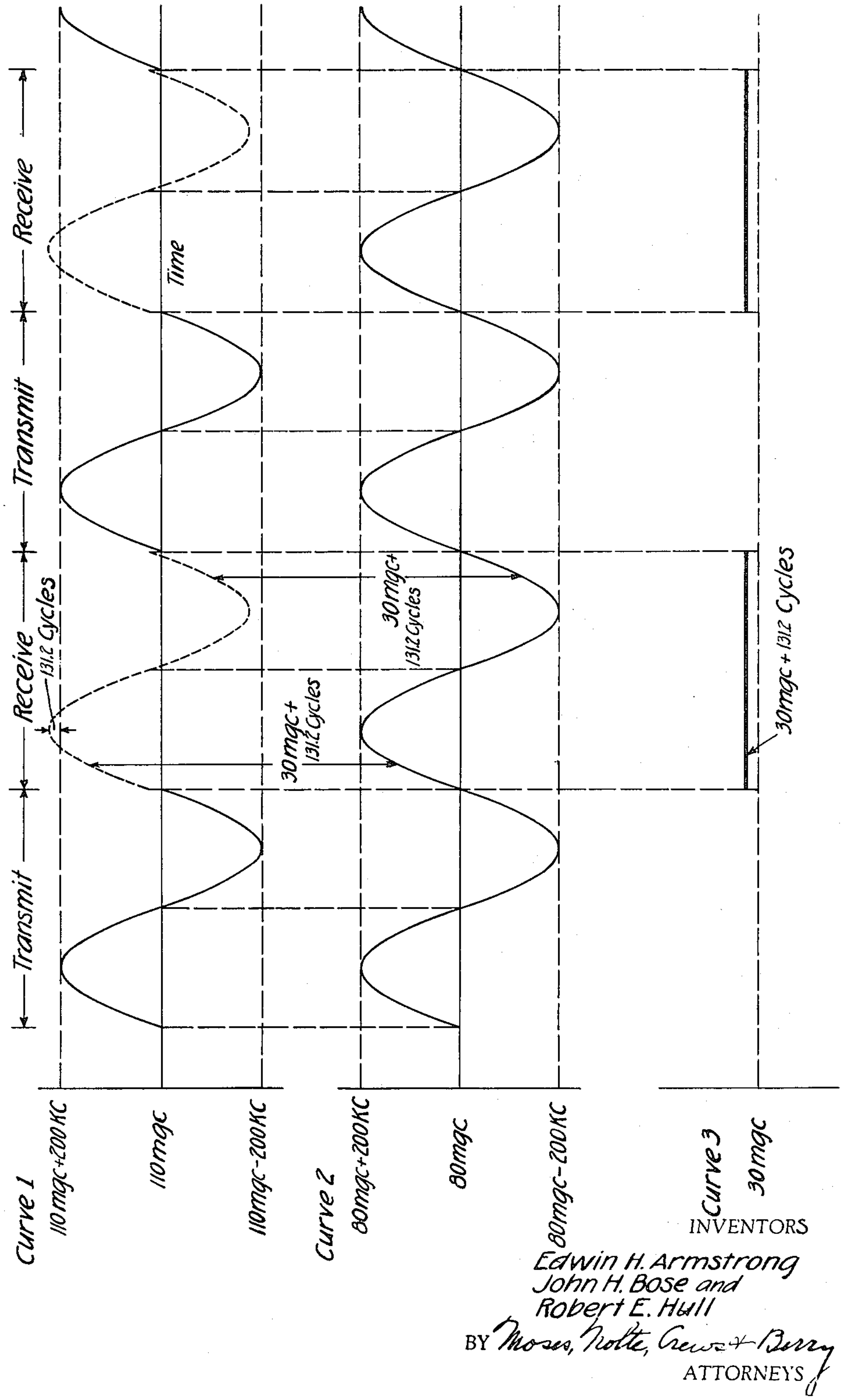
Fig. III.
INVENTORS
Edwin H. Armstrong
John H. Bose and
Robert E. Hull
BY Moses, Nolte, Crews & Berry
ATTORNEYS RADIO DETECTION AND RANGING SYSTEMS
Filed Dec. 30, 1947 9 Sheets-Sheet 4
Fig. IV. Transmitter
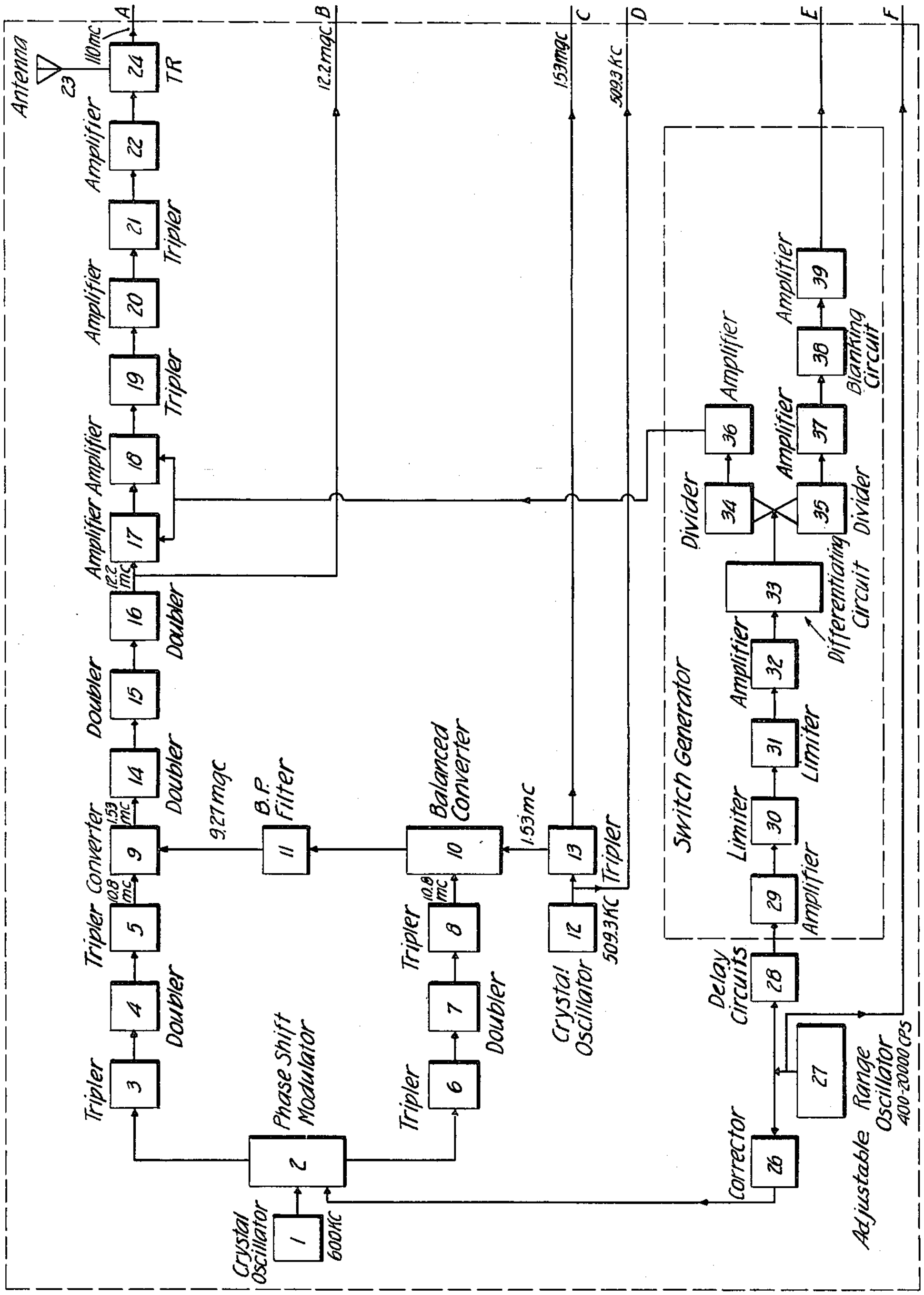
INVENTORS
Edwin H. Armstrong
John H. Bose and
Robert E. Hull
BY Moses, Nolte, Crews & Berry
ATTORNEYS RADIO DETECTION AND RANGING SYSTEMS
Filed Dec. 30, 1947 9 Sheets-Sheet 5
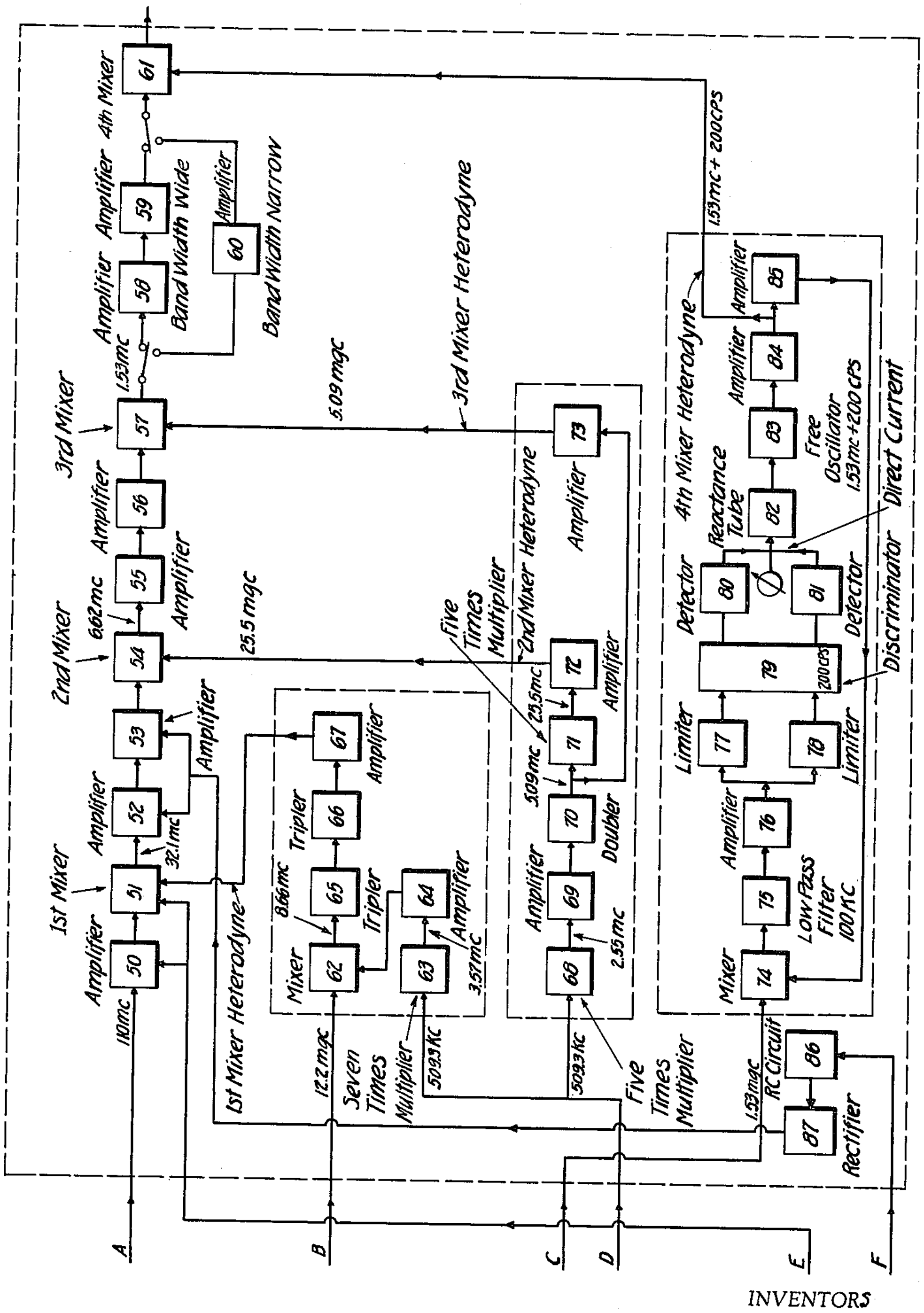
Fig. V
INVENTORS
Edwin H. Armstrong
John H. Bose and
Robert E. Hull
BY Moses, Nolte, Crowe & Berry
ATTORNEYS March 13, 1956 E. H. ARMSTRONG ET AL 2,738,502
RADIO DETECTION AND RANGING SYSTEMS
Filed Dec. 30, 1947 9 Sheets-Sheet 6
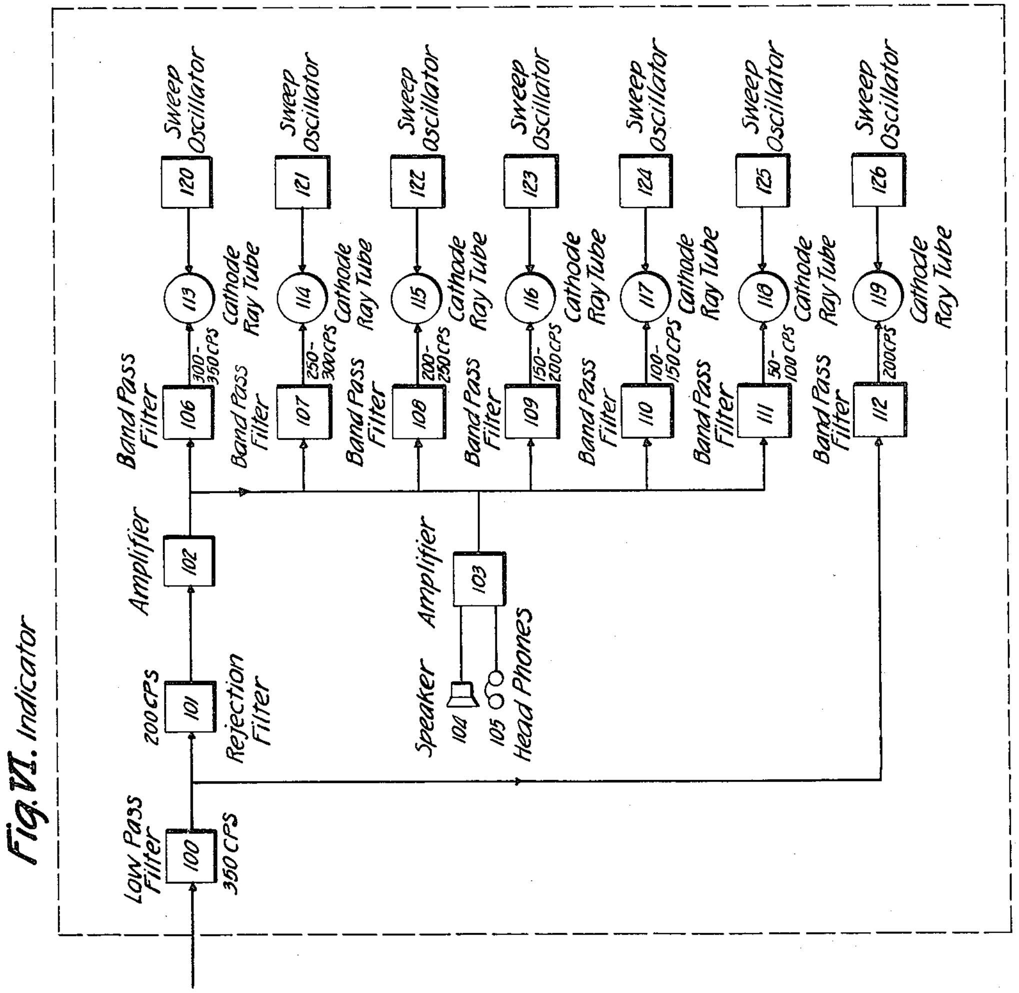
Fig. VI. Indicator
INVENTORS
Edwin H. Armstrong
John H. Bose and
Robert E. Hull
BY Moses, Nolte, Crews & Berry
ATTORNEYS RADIO DETECTION AND RANGING SYSTEMS
Filed Dec. 30, 1947 9 Sheets-Sheet 7
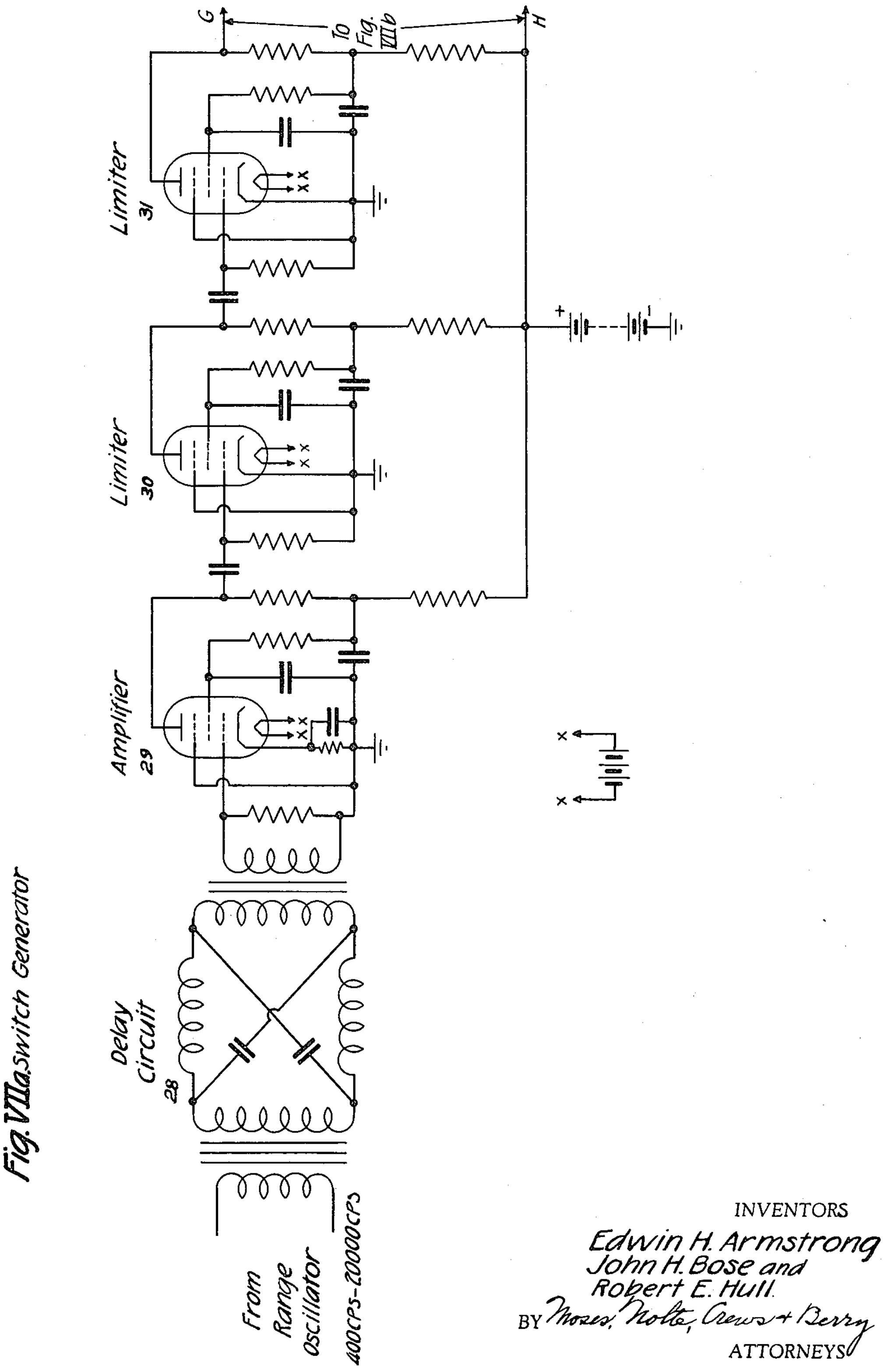
Fig. VIIIa Switch Generator
INVENTORS
Edwin H. Armstrong
John H. Bose and
Robert E. Hull
BY Moses, Nolte, Crews & Berry
ATTORNEYS RADIO DETECTION AND RANGING SYSTEMS
Filed Dec. 30, 1947 9 Sheets-Sheet 8
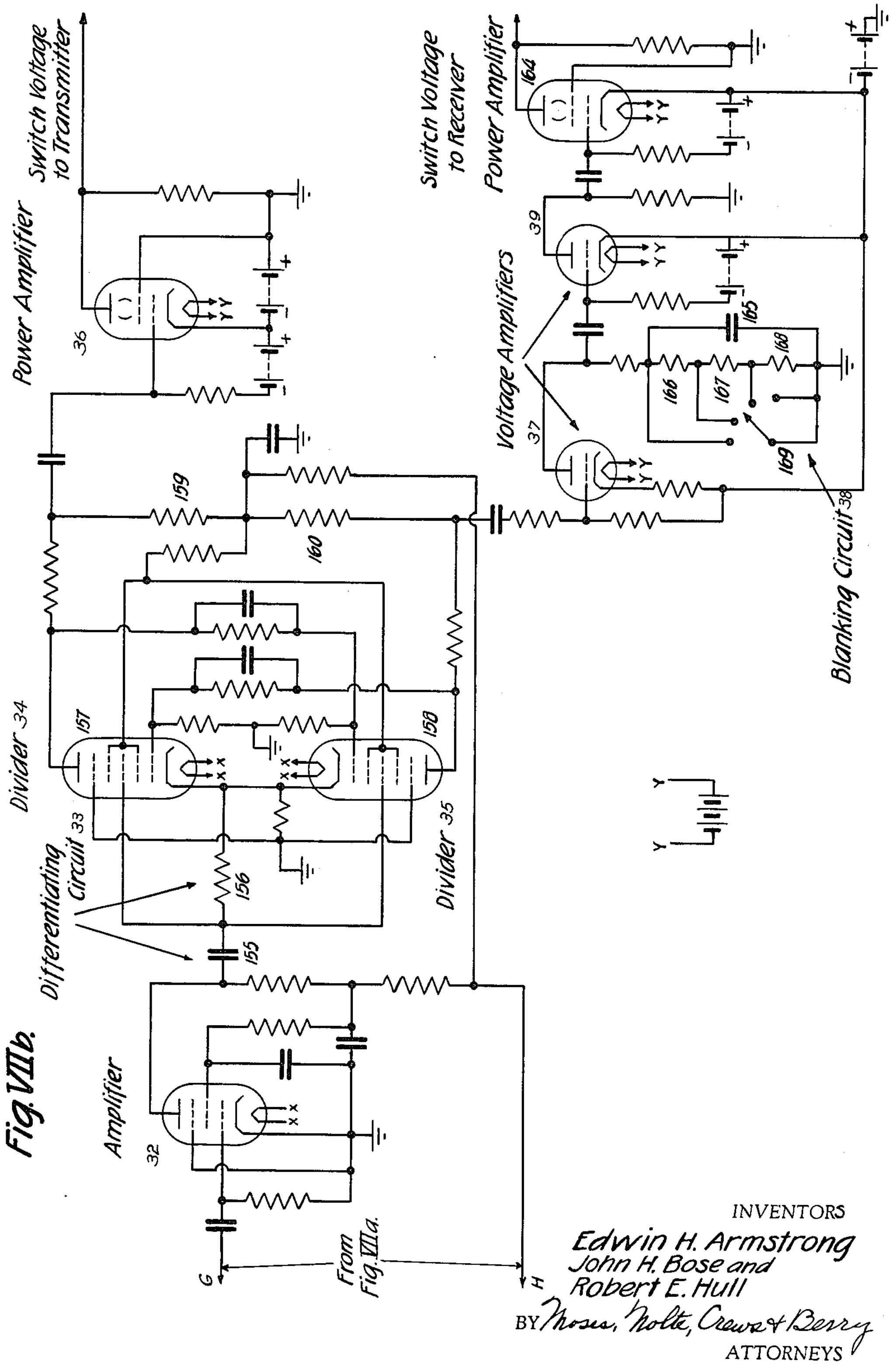
Fig. VIIb.
INVENTORS
Edwin H. Armstrong
John H. Bose and
Robert E. Hull
BY Moses, Nolte, Crews & Berry
ATTORNEYS Fig. VIII.
Transmit Receive Device
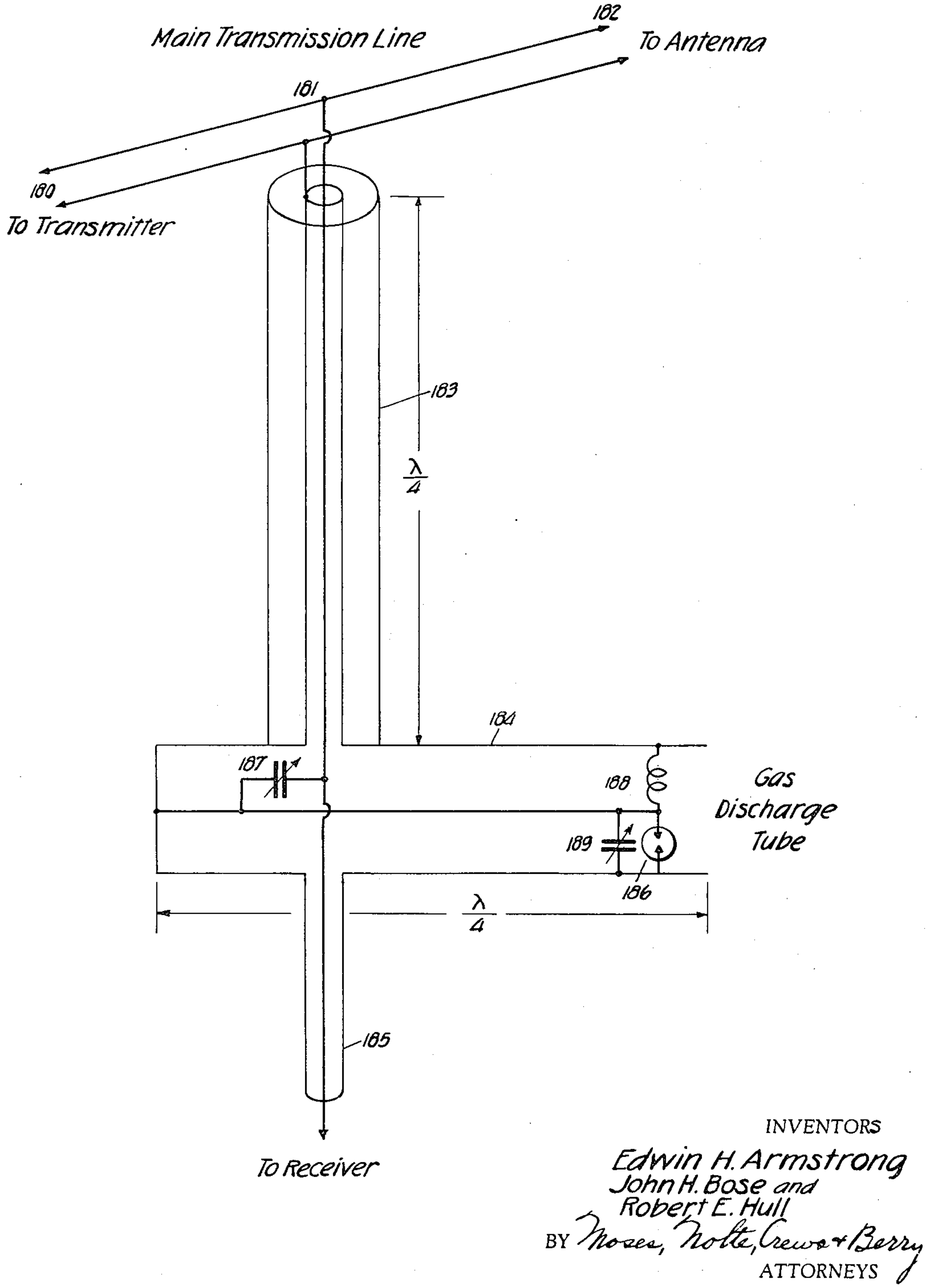
INVENTORS
Edwin H. Armstrong
John H. Bose and
Robert E. Hull
BY Moses, Nolte, Crews & Berry
ATTORNEYS 2,738,502

RADIO DETECTION AND RANGING SYSTEMS

Edwin H. Armstrong and John H. Bose, New York, N. Y., and Robert E. Hull, Tenafly, N. J.; Esther M. Armstrong, executrix of said Edwin H. Armstrong, deceased; said Bose and said Hull assignors to said Esther M. Armstrong, executrix Application December 30, 1947, Serial No. 794,608

14 Claims. (Cl. 343—9)

This invention relates to a new form of radio detection and ranging system for distant objects, commonly known as radar, which utilizes the principles of frequency modulation. It has for its object the provision of a more sensitive and selective system whereby greater range and freedom from interference of various sorts is obtained. It has also for its object the provision of means for distinguishing between fixed and moving targets and for measuring the speed of a moving target relative to the location of the radar station and the sense of the motion. Other objects will appear hereinafter.

Referring to the figures which form a part of this specification:

Figures I, II and III are graphs which illustrate the general theory of operation of the invention. Figs. IV, V and VI show block diagrams of the transmitter, receiver and indicator, respectively, as actually used in operative forms of the equipment. Figs. VII*a* and VII*b* and VIII are electrical diagrams showing details of specific parts of the equipment for which a block diagram would not be sufficiently descriptive.

The principle of operation of the system and the difficulties that it is intended to overcome will first be considered. It is well known that the ordinary type of radar system operates by emitting short pulses of radio frequency waves of a substantially constant frequency, and that the distance to the target is determined by measurement of the time taken for the pulse to travel to the target and return to its initial starting point. In order to obtain a precise definition of the time as well as for other reasons it is necessary to make the duration of the pulses very short, usually a small number of microseconds or millionth parts of a second in length. In order to receive this sort of pulse without distorting its shape it becomes necessary to make the band width of the receiver circuits extremely wide. This gives rise to a high level of noise voltages generated within the receiver by reason of irregularities in the electron emission of the vacuum tubes and by the thermal disturbances among the electrons flowing through the conductors. The energies of both these sources of disturbances, as is well known, varies directly as the band width of the receiver. In practice it has been found necessary to make use of a band width ranging from one half to several megacycles or more. As the reflected echoes which are to be received are generally extremely weak, the requirement of a highly sensitive receiver and a broad band are contradictory. For this reason the average pulse radar system is limited to the detection of signals of the order of a microvolt across the input terminals of the ordinary type receiver.

In accordance with the present invention it is proposed to dispense with the constant frequency pulse system and to determine the range by use of a variable frequency so modulated and so received that the final band width of the receiver may be less than 100 cycles in width. As a consequence of this narrow band of admittance, and as a consequence also of the use of the heterodyne system of detection in the manner hereinafter described, it is possible to receive extremely weak signals. In practice it has been found possible to receive signals of $\frac{1}{50}$ microvolt across the receiver input terminals with corresponding increase in range. In the method of operation employed the transmitter and receiver divide time equally. It is therefore possible to increase the range still further since the transmitter can be made to radiate substantially greater power than it is possible to develop with the pulse system.

The general theory of operation is shown in the curves of Fig. I. Curve 1 illustrates the form of wave actually transmitted and to fix ideas it will be useful to assign numerical values to the wave shown. Assume a frequency of unmodulated emission of 110 megacycles. Curve 1 represents a wave that is varied sinusoidally at a frequency related numerically to the distance to the target in a manner which will appear hereinafter. For the purpose of this explanation we will assume it is modulated at a frequency of 1000 cycles per second and that a frequency deviation of plus and minus 200 kc. is established. As already stated, the transmitter and receiver divide time equally, so that as illustrated in Fig. I, under the conditions assumed, the transmitter sends out a single complete cycle *abc* of the audio frequency modulation. This cycle is completed in one one-thousandth part of a second, following which there is a period of no emission for the same interval *cde* when, at point *e* the aforementioned transmission cycle recommences.

Consider now a target fixed in space 93 miles away from the transmitter. Since the speed of transmission is 186,000 miles per second of frequency modulated wave *abc* will arrive there $\frac{1}{2000}$ of a second later and a very small part of its energy will be reflected and returned to its starting point $\frac{1}{2000}$ part of a second after its arrival at the target point. As a consequence the first cycle of the reflected wave train arrives at the transmitting point $\frac{1}{1000}$ of a second after it initially started out and coincident with the ending of the audio cycle of the transmission at point *c*. The received wave may be considered as a minute replica of the originally transmitted wave, delayed in time by the duration of one cycle of modulation. It coincides therefore exactly in form with the wave which would have been transmitted during that interval were the transmitter in operation. It is therefore possible, for this set of conditions and for no other set to derive from the modulating system of the transmitter a heterodyning current of exactly similar form as the received wave and coinciding so precisely in deviation that a constant frequency difference between the two can be produced. For the purpose of this explanation possible multiple responses are left out of consideration. For purposes of example a heterodyning frequency of 80 megacycles may be assumed in which case, under the conditions given, a constant frequency of 30 megacycles will be produced during those intervals of $\frac{1}{1000}$ second duration when the receiver is in operation. Since when the conditions of the correct modulation frequency for a target at a given distance are met, a constant frequency echo current results in the receiver, it is possible to make the band width of the receiver much narrower than heretofore considered possible with consequent reduction in the level of tube and thermal noise disturbances.

It will be observed that for targets located at distances other than 93 miles from the transmitter that the echo will arrive either before the transmitter cycle has ceased or afterward, depending on whether the target is closer or farther away. Under these conditions a constant frequency is no longer produced in the receiver but a variable one which may take the form shown in Fig. II. As a consequence these currents cannot pass effectively through the narrow band of the receiver so that the radar "sees" only targets for which the ranging or modulation frequency is adjusted.

Consider now the principal object of the system which is the detection of moving targets, and for the purpose of illustration consider a plane at a distance of 93 miles moving toward the transmitter at a speed of 400 miles per hour. Under these conditions the received wave will not be a replica of the transmitted wave but will, in accordance with the well known principles of the Doppler effect, be increased in frequency by a small amount, the increase being given by the formula $$f=\frac{2V}{c}\times f_c$$

where V is the radial velocity of the target in feet per second, $c$ is the velocity of the radio propagation in feet per second, and $f_c$ is the transmitter carrier frequency. The Doppler shift in frequency is indicated in the curves of Fig. III and for the conditions given above is an approximate increase of 131.2 cycles per second. If the target plane were flying in a direction away from the transmitter the echo frequency would be reduced by this amount. It therefore becomes possible to differentiate between fixed and moving targets by means of this system, a matter of the utmost importance for any radar operation. It also is possible to ascertain the speed of the plane with respect to the transmitter and to determine the sense or direction of flight instantaneously so that it is no longer necessary to wait until a plot taken over a period of time gives the vital information of impending attack.

In all of the foregoing explanations the fundamental principles of the operation only have been considered. The practical application of these principles is attended by very great difficulties as will be realized when the stability and distortion requirements of equipment operating at 100 megacycles and capable of passing received signals through filters less than 100 cycles in width are considered. The magnitude of the problem will be clear from the fact that a frequency instability of less than one part in a million would cause the received wave to drift outside of the receiver band width and that distortion as low as one-tenth of one per cent between cycles means a resultant beat frequency likewise outside the band.

The solution of the problems involved here in themselves require the application of new principles of operation and it is now in order to consider this part of the invention. It is impractical to conduct the process of selection at 30 megacycles which is the beat frequency used in the theoretical explanation heretofore given and the operation must be transferred to some lower frequency in order to maintain the stability that is required of the system.

Referring now to Figures IV, V and VI, which show a block diagram of the practical embodiment of the system, Fig. IV covers the essential parts of the transmitter, Fig. V most of the essential parts of the receiver, and Fig. VI the indicator. Because of the nature of the problems encountered and the means taken to secure their solution, the transmitter, receiver and indicator elements are not completely independent entities but are interlocked in ways which will appear hereinafter. This is particularly true of the receiver, whose heterodyning currents for the various frequency conversions are obtained from the frequency control and modulating system of the transmitter.

Referring now to Fig. IV, 1 represents a crystal controlled oscillator; 2 a phase shift modulator, preferably balanced; 3, 4, 5 and 6, 7, 8 a series of multipliers, the two series having identical multiplication and feeding, respectively, converters 9 and 10. 11 represents a band pass filter. 12 represents a crystal controlled oscillator for setting the frequency of the transmitted wave, and 13 a tripler for supplying heterodyning currents to the balanced converter 10.

14, 15, 16 are a frequency multiplier chain, the output of which is fed to two amplifier tubes 17, 18, which are arranged to be keyed by biasing beyond cutoff to interrupt the transmission of signals in the manner heretofore referred to.

19 represents a multiplier, 20 an amplifier, 21 a multiplier and 22 a series of amplifiers, including the power amplifier which excites the antenna 23 in the usual way.

24 represents a TR box, or transmit-receive switch, which will be described hereinafter.

All the multipliers and amplifiers in the 19 to 22 chain are biased beyond cutoff, so that when excitation is removed by the keying of the amplifiers 17, 18 their plate currents all drop to zero.

An examination of the arrangement of the transmitter 1 to 23 will show that it is essentially similar to the two-channel type of phase-shift modulator described in Edwin H. Armstrong's U. S. Patent No. 2,290,159, with the addition of a couple of stages of keyed amplifiers inserted at a point, in this particular case, of one-ninth the frequency to be radiated.

26 represents the usual correction circuit which is employed with the phase shift type of frequency modulation system to secure uniform deviation as disclosed in Armstrong Patent #1,941,068, and 27 represents the source of modulating current. This modulating current consists of a variable frequency oscillator covering the range of 400 to 20,000 cycles for the purpose of ranging on particular targets.

28 represents a series of delay circuits interposed between the range oscillator and the switch generator containing the elements 29 to 39. The purpose of the delay circuits will be hereinafter described. The elements of the switch generator, whose purpose is to alternately activate and deactivate the transmitter and receiver in accordance with the modulation frequency of the oscillator 27 will be described in detail subsequently.

The receiving system shown in Fig. V is essentially a four intermediate frequency superheterodyne. 50 represents one or more stages of R. F. amplification at the received frequency; 51 the first converter or mixer; 52 and 53 two stages of amplification at the first I. F. frequency; 54 the second converter and 55, 56 amplifiers at the second intermediate frequency. 57 represents the third converter and 58 and 59 amplifiers for the third intermediate frequency and having essentially a wide band. 60 represents an alternate amplifier for this same frequency having a narrow band. This amplifier may be substituted for the broad band amplifier in the manner shown.

61 represents the fourth converter for heterodyning to the final frequency which is used in the indicator. This, as will appear hereinafter, is of the order of a few hundred cycles.

62 represents a mixer supplied with frequency modulated current from a point in the transmitter at the output of multiplier 16 and also with a multiple of the frequency determining crystal oscillator 12. 63 represents a multiplier and 64 an amplifier for supplying the current of multiplied frequency from the crystal 12 to the mixer 62.

65 and 66 are multipliers of the output of the mixer 62, and 67 an amplifier for supplying the multiplied output to the mixer 51.

68 is a multiplier, 69 an amplifier, 70 a multiplier, 71 a multiplier and 72 an amplifier for furnishing the heterodyning current to the second mixer 54. This is a fixed frequency heterodyne derived from the fixed frequency crystal 12.

73 is an amplifier arranged to amplify the output of the multiplier 70 for furnishing the heterodyning current of the third mixer 57.

83 represents a free oscillator and 84 an amplifier for supplying a fixed frequency heterodyning current to the fourth or last mixer 61.

74–82 and 85 represent a frequency control system for the free oscillator 83 to maintain it at a frequency difference of a couple of hundred cycles from a reference frequency which is a multiple of the crystal controlled frequency 12. Specifically, 74 represents a mixer supplied with three times the crystal controlled frequency of the oscillator 12 and with the frequency of the free oscillator 83 via the amplifier 85. 75 represents a low-pass filter for the output of the mixer 74, 76 an amplifier, 77 and 78 limiters respectively, 79 a 200-cycle balanced discriminator and 80 and 81 balanced detectors whose output controls the reactance tube 82.

86 represents a resistance-capacity network supplied with current from the output of the range oscillator 27 and designed to pass current inversely as the frequency to the rectifier 87. The output of the rectifier 87 is applied to the amplifiers 52 and 53 to control their amplification in accordance with the range at which the system is being operated.

It will be observed that the R. F. amplifiers 50 and the mixers 51 are arranged to be keyed by the output of the amplifier 39 in accordance with the operation of the switch generator. Under some conditions it may also be advisable to key an additional amplifier in one of the I. F. stages, as, for example, the amplifier 52.

Although conductors have not generally been designated by reference characters, not specifically referred to in this description, the connections A, B, C, D, E and F have been marked in Figs. IV and V to facilitate reading of the figures.

Fig. VI indicates two ways of presenting the target indications. 100 represents a low pass filter which, for operation on approximately 100 megacycles and a plane speed of 400 miles an hour, may pass up to 350 cycles per second. 101 is a rejection filter having a rejection band centered, in the present instance, at 200 cycles, with a rejection of plus or minus approximately 10 cycles. 102 represents an amplifier feeding a loudspeaker and headphone system 104, 105 with its associated amplifier 103. 106 to 111 represents a set of band pass filters, collectively extending from 50 to 350 cycles, and each approximately 50 cycles wide. 112 represents a band pass filter centered at 200 cycles per second and covering approximately the same band width that the 101 rejection filter is designed for. It will be observed that the band pass filter 112 is connected ahead of the rejection filter 101, whereas the band pass filters 106–111 are connected in the circuit after the rejection filter 101.

113 to 119 are cathode ray tubes connected, respectively, to the band pass filters 106 to 112. 120 to 126 are the ordinary sweep oscillators for individually sweeping the cathode ray tubes 113 to 119.

The manner of operation of this system may be understood from the following description. Assume that it is desired to range on a target 93 miles away. The range oscillator 27 is set at 1000 cycles and modulates the transmitter system 1—23 so as to transmit a frequency modulated wave at 110 megacycles having a sinusoidal deviation of plus and minus 200,000 cycles. This variation in frequency occurs, of course, 1000 times per second.

Also connected to the range oscillator is a switch generator 29—39, a device actuated by the modulating frequency so as to cut off the transmitter on alternate cycles of modulation in the manner indicated in Fig. I. It is required that the transmitter be keyed 500 times a second from a source of 1000 cycle modulating current. This is accomplished by means of the differentiating circuit 33 and the alternate cycle divider 34—35 which produce 500 keying pulses per second. These pulses are applied through the amplifier 36 to the keying of the tubes 17 and 18, the amplifiers of the 12.2 megacycle stage of the transmitter.

The operation of the divider system is somewhat critical with respect to the amplitude of the applied voltage from the ranging oscillator. To insure correct operation over wide ranges of frequency of this oscillator, limiters 30 and 31 are interposed between the ranging oscillator and the divider input to produce a square wave of constant amplitude. To insure that the keying of the transmitted wave occurs at the desired point of the modulating cycle, adjustable delay circuits 28 are introduced between the range oscillator and the limiter 30.

Coincidentally one phase of the output of the divider 34—35 operates to key the transmitter, the other phase of the divider output operates to key the receiver in the opposite sense. This phase of the output is amplified by the amplifiers 37, 38 and 39 and applied to the grids of the radio frequency amplifiers 50 and the mixer tube 51.

Turning now to the receiver, it will be observed that the receiver will be activated when the transmitter has ceased radiating and will be in condition to receive the reflected echo which will be a replica of that transmitted in the preceding modulation cycle. The first heterodyning current is arranged to deviate in frequency precisely the same amount and in the same sense as the previously transmitted wave, but at some substantially different frequency from it. In the present case this heterodyning frequency is 77.9 megacycles. This frequency is obtained by combining in the mixer 62 two currents derived from different parts of the transmitter. One is a variable frequency current at 12.2 megacycles having one-ninth the deviation of the transmitted wave, and the other is a seven-fold multiple fixed frequency current of the crystal controlled oscillator 12. The difference frequency results in a variable frequency current of 8.66 megacycles having a frequency deviation one-ninth that radiated from the antenna. By multiplying the output of the mixer by the tripler 65 and 66 a heterodyning current having the required characteristics is produced.

Under such circumstances the reflected signal CDE, as indicated in Fig. I has a constant frequency difference with respect to the heterodyne. This difference under the conditions set up is 32.1 megacycles. From this point on the signal is progressively heterodyned down in the second mixer 54 to 6.62 megacycles, the heterodyning current for this frequency being derived from the 50th multiple of the master crystal oscillator 12. This 6.62 megacycle current is heterodyned down in the third mixer 57 to 1.53 megacycles by the heterodyning current which is the 10th multiple of the frequency of the master crystal controlled oscillator 12. The 1.53 megacycles then undergoes the principal amplification in the system by the amplifiers 58, 59, 60 and is supplied to the fourth mixer 61.

At this point the explanation of the system will be facilitated by pointing out that the last intermediate frequency—1.53 megacycles—is exactly three times the frequency of the master crystal controlled oscillator 12 and that if the output of the tripler 13, which is 1.53 megacycles, were used as the heterodyning current for the fourth mixer the output frequency of the mixer would be zero. It is likewise in point to observe that any drift in frequency of the master crystal controlled oscillator 12, either up or down, will not disturb this relationship. The final output of the mixer 61 would be zero frequency and would remain so, so long as the target does not move, if the output of the tripler 13 were used directly as the heterodyning current in the mixer 61. The condition of zero beat frequency will also hold for all deviations, as any change in the swing of the transmitted wave is exactly compensated for by a change in the deviation of the first heterodyning current. It will be observed, therefore, that by reason of this process of coordination between the control of the transmitted frequency and the heterodyne of the receiver it is possible to hold the heterodyned output of the receiver to a stability not heretofore accomplished.

Assume now that the target is not fixed, but is moving toward the station at a speed of 400 miles per hour. Under these circumstances and for the frequency of 110 megacycles the received frequency will not be a replica of the transmitted frequency but will be increased by approximately 131 cycles per second. Since all heterodyning currents are on the low side, each intermediate frequency will be increased by the same amount and the final output will be a current of 131 cycles interrupted for symmetrical periods of 1/1000 of a second 500 times per second. This current may be passed through a low pass filter such as 100 to remove the high frequency interruption rate, leaving a continuous frequency of 131 cycles per second, which may be indicated by either audible or visual means.

Assume now that the target is moving away from the station similarly at a speed of 400 miles per hour. Under these conditions the received frequency will be reduced by approximately 131 cycles per second, and similarly, each intermediate frequency will be reduced by the same amount. The final output of the mixer 61 will again be 131 cycles; that is, the Doppler frequency indication for the same absolute speed toward or away from the station will be exactly the same; indication of the direction of flight is not instantaneous but must be determined by observing the change in range of the plane as indicated by the adjustment of the range oscillator 27.

It is now in order to describe the arrangement whereby the sense of the motion of the target with respect to the station can be immediately obtained. If instead of utilizing the output of the tripler 13 as the final heterodyning current a separate oscillator running at 1.53 megacycles plus 200 cycles is employed as the source of heterodyning current of the mixer 61, then a different situation will result. A target traveling toward the station at 400 miles per hour would produce an output frequency of 69 cycles, while a plane traveling at the same speed away from the station would produce a frequency of 331 cycles per second. These two alternative frequencies would pass respectively through the filters 106 and 111 and would be indicated by the respective corresponding cathode ray oscilloscopes 113 and 118, thereby enabling instantaneous indication of the direction of flight. Correspondingly lower speed planes would appear in their respective scopes. It will be seen that, depending on the scope in which the indication appears, it is possible to determine immediately whether a target is moving toward or away from the station, as well as its radial speed thereto.

It is pointed out that for the indication of a target the setting of the frequency of the range oscillator 27 requires careful adjustment when the frequency deviation of the system is large and more freedom of adjustment when the deviation is small. The accuracy of the indication of target range increases directly with the deviation of the system.

In the practical operation of this system it is, of course, of the utmost importance that the frequency of the oscillator supplying the last heterodyning current be maintained with great accuracy at a fixed frequency difference with respect to the master crystal oscillator. This can be be done in a variety of ways, such as making oscillator 83 crystal controlled, or by holding its frequency by means of a reactance tube such as 82, whose operation is controlled in any one of the well known methods of frequency stabilizing. In the present system the output of the oscillator 83 is supplied to the mixer 74 in conjunction with the output of the tripler 13 to get a beat frequency of the desired amount, namely, 200 cycles, which is passed through limiters 77 and 78 and a discriminator detector system 79, 80, 81, in a manner well known in the art. The balanced output of the detectors 80, 81 control the reactance tube 82 to maintain the frequency difference of 200 cycles.

It is now in order to point out two principal advantages of the system, both of which arise by reason of the extreme stability obtained by anchoring transmitter and receiver controls to the same frequency controlling crystal. By reason of this stability it is possible to operate in a practical way with filters having an admittance band width as low as 50 cycles in the manner shown. Filters having band widths no greater than 10 cycles have been successfully utilized.

The importance of this narrow band width in securing great sensitivity is of fundamental importance. In receivers at 110 megacycles it is possible to design radio frequency amplifiers so that the principal noise arising within the system will be the thermal noise of the antenna circuit. Under these conditions, for a band width of 50 cycles the thermal noise for a 50-ohm impedance input circuit is less than 1/100 of a microvolt. Where no external noise is encountered it thus becomes possible to receive signals slightly stronger than this, and in practice an indciated response on input signals of the order of 1/50 of a microvolt have been obtained. This is, of course, a sensitivity far greater than any heretofore realized in radar operation.

In order to realize these sensitivities in practice it is necessary to take extreme precautions to eliminate any frequency modulation other than that produced by the range oscillator and all amplitude modulation in the transmitted wave. These modulations may result either from improperly filtered power supplies or from vibration of various sorts. Blower motors in the high power part of the equipment have been found particularly objectionable. The result of any of these modulations is to produce spurious responses in the scopes, particularly in the presence of large fixed echoes as will be hereinafter described. The elimination of these disturbances must be effected through extreme measures not hitherto employed in ordinary radio practice.

The second advantage of this system is the elimination of permanent echoes or reflections from fixed targets which at ordinary ranges may be many times greater than the reflections from moving targets. These are returned at the transmitted frequency and so give a beat frequency of 200 cycles per second.

For further dealing with these echoes a band rejection filter 101 of about 20 cycles total width and centered at 200 cycles per second is inserted after the detector. In view of the narrow band of rejection required, a high rejection ratio at 200 cycles with respect to the rest of the band may be obtained. This filter will be effective against fixed targets provided no amplitude or frequency modulation resulting from 60 cycle or 120 cycle power supply equipment has been superimposed upon the wave. If such modulation is present, then frequencies of 200 cycles plus and minus 60, 200 cycles plus and minus 120, etc., appear. These pass by the rejection filter and through the respective band pass filters 106 to 111, being indicated on their respective scopes. Hence, it is essential that no such spurious modulation be permitted on the transmitted wave.

Modulation due to vibration, instead of appearing as discrete frequencies in the indicator usually appears as a disturbance simultaneously present in all the scopes.

It is of interest to note that harmonic distortion emanating from the range oscillator or through overloading any of the tubes in the modulating system is not ordinarily serious for the reason that a complete cycle of modulation is utilized, and due to the stability of the system these modulation cycles repeat themselves accurately. The above statement applies only when the range frequency of the range oscillator is not being changed as it is in the case when the system is searching.

A differentiation between fixed and moving targets of several hundred to one has been obtained in practice. Greater differentiation depends upon the precision with which the various precautions that have been above referred to are carried out.

It will, of course, be obvious that the band pass filters may be subdivided as finely as desired so as to more accurately ascertain the speed of the moving target. However, due to the increase in transient response as the filters become narrower, this results in a reduction of the speed at which search can be carried on.

It has been found in practice that echoes from objects in the immediate vicinity of the station set up transient responses which are occasioned as the result of the transmitter keying. Two means of combatting them may be used. One is to interrupt the cycle at the point where the frequency is changed most rapidly. The other is to arrange to activate the receiver a short interval after the transmitter has been keyed off. These two precautions result in increasing the difference in the frequency of the echo from that to which the receiver is tuned to respond at the moment of the activating of the amplifiers 50 and mixer 51. The point of interruption of the cycle is determined by an adjustable delay circuit 28 which controls the timing of the divider circuit and by the inclusion of a blanking device 38 consisting of an RC circuit which acts to delay the opening of the receiver to incoming signals for a small fraction of the modulation cycle.

The third advantage of the system which has been mentioned before, but not stressed, is the ability to radiate a wave of greater power than it is possible to obtain with the pulse system. This is because the power that can be emitted by any form of system depends, among other things, upon plate dissipation and peak voltage which the tube will stand, and the maximum filament emission of which it is capable. For a given plate dissipation much more average power can be obtained from the tube which is operating at a substantially uniform output; or, as in the present case, on a 50% duty cycle. In this type of operation the limitations of peak voltage and filament emission apply to a much less extent than with the short pulse type transmitter. As a consequence, increased range for this reason alone is obtainable.

Referring now to Figures VII*a* and VII*b*, there are illustrated the details of the switching mechanism for alternately keying the transmitter and the receiver so as to divide time on a 50% duty cycle basis between them. This keying system, which is operated by the ranging frequency oscillator, must meet the condition that it perform its switching operation once every full cycle of the ranging frequency. This is accomplished by providing a divider circuit which is operated in the manner hereinafter to be described.

Referring now to the details of the system, 28 represents a time delay network whose input is connected to the range oscillator 27 of Figure IV and whose output is connected to the amplifier 29. 30 and 31 are limiters for the purpose of squaring up the sine wave output of the ranging frequency oscillator. 32 is an amplifier for this square wave, and 155, 156 is a condenser-resistance combination in the output of the amplifier 32 so proportioned as to act as a differentiating circuit 33. 157 and 158 are tubes with their associated circuits 34 and 35 arranged to act as a quick acting trigger dividing circuit whose output is a square wave of one-half the frequency of the square wave in the output of the amplifier 32.

The plate circuits of the tubes 157 and 158 are arranged in push-pull operation, with the tube 157 operating through the amplifier 36 to key the transmitter and the tube 158 operating through a series of three amplifiers 37, 39 and 164 to key the receiver. The two amplifier chains are keyed respectively by the voltage drop across the load 159 and 160 of the tubes 157 and 158.

Reference has heretofore been made to a method of combatting the echoes from objects in the immediate vicinity of the station by arranging to delay the activation of the receiver until a short interval after the transmitter has been keyed off. This delay or "blanking circuit" 38 is arranged in the output of the voltage amplifier 37 and consists of a condenser 165 shunting a series of resistances 166, 167 and 168. Selection of the amount of delay desired is made by the switch 169. Reference also has been made to the combatting of nearby fixed echoes by the adjustment of the time of switching to coincide with the greatest rate of change of the transmitted frequency. The delay circuits 28 are for the purpose of making this adjustment.

In order to effectively utilize the same antenna for both transmission and reception it is necessary, where high power is involved, to furnish some means of limiting the power which may be fed into the receiver input. The apparatus used for this purpose is known as a TR box, and the technique of its use has been thoroughly developed in the case of pulse systems. In the case of the present system the problem is more difficult because higher average powers are used and because the almost continuous nature of the transmission results in a serious heating problem in the device whose change in conductivity is made use of to check the flow of energy into the receiver.

Figure VIII illustrates a new type of TR box which has been effectively utilized. In the arrangement shown, 180, 181 and 182 illustrates the transmission line running from the transmitter to the antenna. The TR box 183, 184 and 185 is connected to the main transmission line at point 181 at a point three-quarters wave length (or any odd multiple of a quarter wave length) from the end of the transmitter coupling loop. In accordance with standard practice the receiver which is connected as indicated is protected by the quarter wave section 184 which contains a gas discharge tube 186 in the position shown. Two additional features include a capacity 187 for tuning out the reactance of the bottom end of the center conductor of the quarter wave section 184, and an inductance 188 for neutralizing the capacity of the gas discharge tube 186 and the parallel tuning condenser 189. To balance the TR box with respect to the two-wire main transmission line an outer shield 183 is provided for the quarter wave section 184.

With this arrangement it is possible to hold the voltage developed across the receiver input terminals to a point where the voltage developed by the transmitter is insufficient to overcome the biasing off voltage applied by the keyer to the grids of the radio frequency tubes. This device has operated successfully with average powers of the order of five kilowatts.

It will be understood that both of these expedients, namely, the division of time between transmitter and receiver by the keying system and the TR box are necessary because of the high power employed and the use of the same antenna for both transmitter and receiver. Where high power is not utilized, or where other means of protecting the receiver from the transmitter are employed, such as highly directional antennas properly spaced, these expedients may be dispensed with. Theoretically, this would make a more desirable system as the keying under certain circumstances may give rise to spurious indications. In practice, however, the system of dividing time will probably continue to be preferable.

In the operation of this system there is a certain difficulty encountered that is peculiar to the system. At particular ranges and radiated frequencies the reflections from fixed targets have side band components or transients caused by the keying of the transmitter which give rise to false indications in the moving target indicators. In effect this results in a blind spot for certain ranges of operation at a given transmitted frequency as it is difficult to distinguish the moving target indications from the false signals.

The difficulty can be obviated by the selection of transmitted frequencies for given ranges so that the principal transients fall either higher or lower than the Doppler or moving target frequencies, to enable their rejection by filtering means.

We have described what we believe to be the best embodiments of our invention. We do not wish, however, to be confined to the embodiments shown, but what we desire to cover by Letters Patent is set forth in the appended claims.

We claim:

1. In a radar system, a frequency modulation transmitter and a heterodyne receiver, said transmitter including frequency controlling oscillator means, a frequency modulating range oscillator adjustable in frequency to effect a signal frequency swing of selected frequency, and keying mechanism controlled by the range oscillator for causing the transmitted signal during alternate modulation cycles only to be radiated and for enabling the receiver to receive the reflected signal during other alternate modulation cycles only, said receiver including converters in which frequencies derived from the frequency controlling oscillator means of the transmitter and from the modulated signal are combined with the reflected signal to produce a derived signal current of predetermined constant frequency when the period of the range oscillator is adjusted to be equal to that of the out and back travel of the signal.

2. In a radar system, a frequency modulation transmitter and a heterodyne receiver, said transmitter including frequency controlling oscillator means, a frequency modulating range oscillator adjustable in frequency to effect a signal frequency swing of selected frequency, and keying mechanism controlled by the range oscillator for causing the transmitted signal to be radiated during alternate modulation cycles only, and for enabling the receiver to receive the reflected signal during other alternate modulation cycles only, said receiver including converters in which frequencies derived from the frequency controlling oscillator means of the transmitter and from the modulated signal are combined with the reflected signal to produce a derived signal current of predetermined constant frequency when the period of the range oscillator is adjusted to be equal to that of the out and back travel of the signal, and indicator means responsive to said derived signal current.

3. In a radar system, a frequency modulation transmitter and a heterodyne receiver, said transmitter including frequency controlling oscillator means, a frequency modulating range oscillator adjustable in frequency to effect a signal frequency swing of selected frequency, and keying mechanism controlled by the range oscillator for causing the transmitter signal during alternate modulation cycles to be radiated and for enabling the receiver to receive the reflected signal during the other alternate modulation cycles only, said receiver including converters in which frequencies derived from the frequency controlling oscillator means of the transmitter and from the modulated signal are utilized for heterodyning the reflected signal and for deriving from the signal when reflected from a moving target a frequency which is a function of the change of frequency that results from the Doppler effect, and frequency indicator means for showing the magnitude and sense of such change of frequency.

4. In a radar system, a frequency modulation transmitter and a heterodyne receiver, said transmitter including frequency controlling oscillator means, a frequency modulating range oscillator adjustable in frequency to effect a signal frequency swing of selected frequency, and keying mechanism controlled by the range oscillator for causing the transmitted signal during alternate modulation cycles only to be radiated and for enabling the receiver to receive the reflected signal during other alternate modulation cycles only, said receiver including converters in which frequencies derived from the frequency controlling oscillator means of the transmitter and from the modulated signal are combined with the reflected signal to produce a derived signal current of predetermined constant frequency when the period of the range oscillator is adjusted to be equal to that of the out and back travel of the signal, and, when the signal is reflected from a moving target, for producing a derived signal whose frequency is a function of the change of frequency that results from the Doppler effect, indicator means comprising a group of sharply tuned indicators jointly covering the entire range of frequencies that may be so derived, a narrow band rejection filter in series with said group for excluding from said group the frequency, within the composite range of the group, that is derived when the target is stationary and the period of the signal swing coincides with the period of out and back transmission, and a narrow band-pass filter in series with the last mentioned indicator for passing only the narrow band of frequencies which is excluded from the group of indicators.

5. In a radar system, a frequency modulation transmitter and a heterodyne receiver, said transmitter including frequency controlling oscillator means, a frequency modulating, range oscillator adjustable in frequency to effect a signal frequency swing of selected frequency, and keying mechanism controlled by the range oscillator for causing the transmitted signal throughout alternate modulation cycles only to be radiated and for enabling the receiver to receive the reflected signal throughout the other alternate modulation cycles only, said receiver including converters in which varying frequencies derived from the frequency controlling oscillator means of the transmitter and from the modulated signal are combined with the reflected signal of varying frequency and with constant frequencies to produce a derived audio frequency signal of constant frequency when the target is stationary and the period of the signal swing is adjusted to be equal to that of the out and back travel of the signal, and to produce other audio frequencies which are a function of the speed and direction of travel of the target when the target is moving, all of which derived frequencies lie within a narrow range of frequencies, an audible indicator responsive to said derived frequencies, and a filter for excluding from the indicator all frequencies lying outside said narrow range.

6. In a radar system, a frequency modulation transmitter and a heterodyne receiver, said transmitter including frequency controlling oscillator means, a frequency modulating range oscillator adjustable in frequency to effect a signal frequency swing of selected frequency, and keying mechanism controlled by the range oscillator for causing the transmitted signal throughout alternate modulation cycles only to be radiated and for enabling the receiver to receive the reflected signal throughout other alternate modulation cycles only, said receiver including converters in which varying frequencies derived from the frequency controlling oscillator means of the transmitter and from the modulated signal are combined with the reflected signal of varying frequency, and with constant frequencies to produce a derived signal of constant frequency when the target is stationary and the period of the signal swing is adjusted to be equal to that of the out and back travel of the signal, and to produce other constant frequencies lying in a narrow band at one side of said derived frequency when the target is approaching and at the other side of said derived frequency when the target is receding.

7. In a radar system, a frequency modulation transmitter and a heterodyne receiver, said transmitter including frequency controlling oscillator means, a frequency modulating range oscillator adjustable in frequency to effect a signal frequency swing of selected frequency, and keying mechanism controlled by the range oscillator for causing the transmitted signal throughout alternate modulation cycles only to be radiated and for enabling the receiver to receive the reflected signal throughout the other alternate modulation cycles only, said receiver including converters in which varying frequencies derived from the frequency controlling oscillator means of the transmitter and from the modulated signal of varying frequency and with constant frequencies are combined with the reflected signal to produce a derived signal of constant frequency when the target is stationary and the period of the signal swing is adjusted to be equal to that of the out and back travel of the signal, and to produce other frequencies lying in a narrow band at one side of said derived frequency when the target is approaching and at the other side of said derived frequency when the target is receding, an indicator mechanism responsive to said derived frequencies, and a filter for excluding from the indicator mechanism all frequencies lying outside the narrow range including said bands.

8. A radar system comprising, in combination, a frequency modulation transmitter and a receiver, said transmitter comprising a signal generating mechanism which includes frequency controlling oscillator means, a constantly operating frequency modulating range oscillator adjustable in frequency to effect a signal frequency swing of selected frequency, a common antenna for the transmitter and receiver, and keying mechanism controlled by the range oscillator for rendering the transmitter operative to radiate the modulated signal during alternate modulation cycles and inoperative to radiate the modulated signal during the other alternate modulation cycles, and also for rendering the receiver inoperative to receive the modulated signals from the antenna or the transmitter during the first mentioned alternate modulation cycles and operative to receive signals from the antenna and the transmitter during the second mentioned alternate modulation cycles, said receiver including converters in which frequencies derived from the frequency controlling oscillator means of the transmitter and from the modulated signal are combined with the reflected signal to produce a derived signal current of predetermined constant frequency when the period of the range oscillator is adjusted to be equal to that of the out and back travel of the signal.

9. In a radar system comprising a transmitter and a receiver, in combination, a signal generating mechanism which includes frequency controlling oscillator means, a frequency modulating range oscillator adjustable in frequency to effect a signal frequency swing of selected frequency, keying mechanisms controlled by the range oscillator for causing energy to be radiated during alternate modulation cycles and not to be radiated during the other alternate modulation cycles and an adjustable delay circuit interposed between the range oscillator and the keying mechanism for determining the exact point in the cycle at which the keying becomes effective.

10. In a radar system comprising a transmitter and a receiver, in combination, a signal generating mechanism which includes frequency controlling oscillator means, a frequency modulating range oscillator adjustable in frequency to effect a signal frequency swing of selected frequency, keying mechanism controlled by the range oscillator for causing alternate modulation cycles to be radiated and the other alternate modulation cycles not to be radiated, and for rendering the receiver inoperative to receive reflected signals during the first mentioned alternate modulation cycles and operative to receive reflected signals during the second mentioned alternate modulation cycles, and a variable resistance delay mechanism embodied in said keying mechanism and settable to cause a delay of desired duration between the interruption of transmitting and the resumption of receiving.

11. In a radar system, a frequency modulation transmitter and a receiver, said transmitter comprising a signal generating mechanism which includes frequency controlling oscillator means, a frequency modulating range oscillator adjustable in frequency to effect a signal frequency swing of selected frequency, keying mechanism controlled by the range oscillator for causing the signal to be radiated during alternate modulation cycles and not to be radiated during the other alternate modulation cycles, the receiver including mixers for heterodyning the reflected signal to produce a derived signal of predetermined constant frequency when the period of the range oscillator is adjusted to be equal to that of the out and back travel of the signal, the receiver also including amplifier mechanism controlled from the range oscillator of the transmitter, and a resistance-capacity circuit through which current from the range oscillator is made effective to control the amplifier mechanism, said resistance-capacity circuit having the property of passing current inversely as the frequency and hence in proportion to the target range, so that the controlled amplification will be varied in accordance with the target range.

12. In a radar system, the combination with a transmitter employing a frequency modulating range oscillator whose frequency is designed to be adjusted in inverse relation to the target range, of a receiver including amplifier mechanism controlled from the range oscillator, and a resistance-capacity circuit interposed between the range oscillator, and the amplifier mechanism, the resistance-capacity circuit having the property of passing current inversely as the frequency and hence in proportion to the target range, so that the output of the resistance-capacity circuit when rectified can be used to vary the amplification in accordance with the target range.

13. In a radar system comprising a transmitter and a receiver, in combination, a signal generating mechanism which includes frequency controlling oscillator means, a frequency modulating range oscillator adjustable in frequency to effect a signal frequency swing of selected frequency, mechanism controlled by the range oscillator for causing alternate modulation cycles to be radiated and the other alternate modulation cycles not to be radiated, and for rendering the receiver inoperative to receive reflected signals during the first mentioned alternate modulation cycles and operative to receive reflected signals during the second mentioned alternate modulation cycles, said mechanism comprising a switch generator which includes a differentiation circuit, and circuit means comprising a divider of the modulating frequency for applying energy derived from successive cycles of the modulating frequency in alternation to grids of transmitter and receiver amplifiers.

14. A radar system comprising, a frequency modulation transmitter and a heterodyne receiver, said transmitter including frequency controlling oscillator means, and a frequency modulation range oscillator adjustable in frequency to effect a signal frequency swing of selected frequency, and said receiver including converter mechanism in which frequencies derived from the frequency controlling oscillator means of the transmitter and the modulated signal are combined with the reflected signal to produce a derived signal of constant frequency when the period of the range oscillator is adjusted to be equal to that of the out and back travel of the signal.

References Cited in the file of this patent

UNITED STATES PATENTS

| | | |
|---|---|---|
| 1,585,591 | Lowy | May 18, 1926 |
| 2,301,929 | Budenbom | Nov. 17, 1942 |
| 2,407,644 | Benioff | Sept. 17, 1946 |
| 2,412,161 | Patterson | Dec. 3, 1946 |
| 2,412,315 | Brown | Dec. 10, 1946 |
| 2,422,134 | Sanders | June 10, 1947 |
| 2,422,157 | Wolff | June 10, 1947 |
| 2,423,644 | Evans | July 8, 1947 |
| 2,424,854 | Sanders | July 29, 1947 |
| 2,433,669 | Keister | Dec. 30, 1947 |
| 2,444,388 | De Vries | June 29, 1948 |
| 2,485,583 | Ginzton | Oct. 25, 1949 |